United States Patent
Tzeng et al.

(10) Patent No.: US 6,741,594 B1
(45) Date of Patent: May 25, 2004

(54) ARRANGEMENT FOR IDENTIFYING DATA PACKET TYPES FROM MULTIPLE PROTOCOL FORMATS ON A NETWORK SWITCH PORT

(75) Inventors: Shr-jie Tzeng, Fremont, CA (US); Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 674 days.

(21) Appl. No.: 09/594,604

(22) Filed: Jun. 15, 2000

(51) Int. Cl.$^7$ ............................................. H04L 12/56
(52) U.S. Cl. ..................... 370/392; 370/252; 370/469
(58) Field of Search .............................. 370/252, 253, 370/254, 389, 392, 401, 411, 465, 466, 469, 365, 514; 709/230, 250; 375/368

(56) References Cited

U.S. PATENT DOCUMENTS

| | | | | |
|---|---|---|---|---|
| 5,204,859 A | * | 4/1993 | Paesler et al. | 370/514 |
| 5,517,518 A | * | 5/1996 | Morson et al. | 375/152 |
| 5,732,114 A | * | 3/1998 | Thebault et al. | 375/368 |
| 5,953,335 A | | 9/1999 | Erimli et al. | |
| 6,160,822 A | * | 12/2000 | Kobayashi | 370/511 |
| 6,347,087 B1 | * | 2/2002 | Ganesh et al. | 370/392 |
| 6,356,951 B1 | * | 3/2002 | Gentry, Jr. | 709/250 |
| 6,430,184 B1 | * | 8/2002 | Robins et al. | 370/392 |
| 6,434,651 B1 | * | 8/2002 | Gentry, Jr. | 710/260 |
| 6,453,360 B1 | * | 9/2002 | Muller et al. | 709/250 |
| 6,467,008 B1 | * | 10/2002 | Gentry et al. | 710/261 |
| 6,480,489 B1 | * | 11/2002 | Muller et al. | 370/389 |
| 6,483,804 B1 | * | 11/2002 | Muller et al. | 370/230 |
| 6,553,453 B1 | * | 4/2003 | Gibson et al. | 711/108 |
| 6,560,233 B1 | * | 5/2003 | Hatanaka et al. | 370/401 |
| 6,580,717 B1 | * | 6/2003 | Higuchi et al. | 370/401 |
| 6,606,301 B1 | * | 8/2003 | Muller et al. | 370/230 |

* cited by examiner

*Primary Examiner*—Hassan Kizou
*Assistant Examiner*—Mike McLoughlin
(74) *Attorney, Agent, or Firm*—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a network switch port having a filter (i.e., a packet classifier module) configured for evaluating an incoming data packet on an instantaneous basis. The filter performs simultaneous comparisons between the incoming data stream of the data packet and multiple templates configured for identifying respective data attributes. Each template is composed of a plurality of min terms, wherein each min term specifies a prescribed comparison operation within a selected data byte of the incoming data packet. The templates may be programmed by a user and stored in an internal min term memory. Hence, the filter can identify selected attributes, such as whether the layer 2 packet includes an SNMP packet or an HTTP packet, regardless of whether the IP frame is in IPv4 format or IPv6 format.

17 Claims, 5 Drawing Sheets

US 6,741,594 B1

ARRANGEMENT FOR IDENTIFYING DATA PACKET TYPES FROM MULTIPLE PROTOCOL FORMATS ON A NETWORK SWITCH PORT

BACKGROUND OF THE INVENTION

1. Field of the Invention

The present invention relates to layer 2 and layer 3 switching of data packets in a non-locking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). Such layer 3 processing may be especially difficult as different layer 3 formats are developed. For example, current layer 3 protocols on the Internet mostly use Internet Protocol version 4 (IPv4); however, networks are beginning to deploy the newer version of Internet Protocol version 6 (IPv6). Hence, attempts to deploy the newer version of IPv6 often requires a complete reconfiguration of the router or the network switch in order to accommodate the newer protocol, often at the expense of substantial processing power if a network administrator needs to support both Ipv4 and IPv6 formats.

SUMMARY OF THE INVENTION

There is a need for an arrangement that enables a network switch to provide layer 2 switching and layer 3 switching capabilities for 100 Mbps and gigabit links without blocking of the data packets, regardless of the layer 3 protocol format.

There is also a need for an arrangement that enables a network switch to provide layer 2 switching and layer 3 switching capabilities that can support both Ipv4 and IPv6 formats with minimal modifications.

There is also a need for an arrangement that enables a network switch to be easily programmable to distinguish between different types of layer 3 data packets so that quality of service (QoS) can be achieved.

These and other needs are attained by the present invention, where a network switch port includes a filter configured for evaluating an incoming data packet on an instantaneous basis. The filter performs simultaneous comparisons between the incoming data stream of the data packet and multiple templates configured for identifying respective attributes of the data packet. Each template is composed of at least one branch term having a plurality of min terms, where each min term specifies a prescribed comparison operation with a selected data byte of the incoming data packet. Each branch term specifies a corresponding independent determination of whether the incoming data stream matches the template. The filter accesses the min terms based on the ordering of the data bytes, such that the min terms that are used to compare the first data byte are first accessed for comparison with the first data byte as the first data byte is received; the min terms used to compare the second data byte are then accessed for comparison with the second data byte as the second data byte is received. Hence, the filter simultaneously compares the min terms that correspond to the selected byte of the incoming data packet as the selected byte is received by the network switch port. The results of the comparisons between the min terms and the selected data bytes of the incoming data stream are evaluated by an equation core within the filter, which determines comparison results for each branch term of the templates and outputs a tag to the switching core specifying whether the incoming data steam has the corresponding attribute, providing the switching core with information on how to process the received data packet. Hence, the switching core has sufficient time to perform layer 2 or layer 3 switching of the received data packet in a non-blocking manner in a high-speed data network. Moreover, each branch term can be configured to identify the same attribute according to a corresponding data protocol, for example a corresponding Internet Protocol version. Hence, the network switch port can simultaneously support multiple data protocols, merely by the addition of respective branch terms.

One aspect of the present invention provides a method of evaluating an incoming data packet at a network switch port. The method includes storing a plurality of equations configured for identifying respective data attributes of the incoming data packet, each equation having at least first and second branches for determining whether the incoming data packet has the corresponding data attribute according to first and second data protocol formats, respectively, each branch including at least one min term configured for comparing a corresponding prescribed value to a corresponding selected byte of the incoming data packet. The method also includes independently evaluating the incoming data packet with the branches by simultaneously comparing, to the selected byte, the min terms that correspond to the selected byte as the selected byte is received by the network switch port. A comparison result is then generated that identifies the data attribute of incoming data packet independent of whether the data packet has one of the first and second data protocol formats, based on the comparisons of the min terms to the data bytes received by the network switch port. The storage of equations configured for identifying respective data attributes enables the network switch port to be easily programmable to identify user-defined data attributes. Moreover, the branches for identifying the attribute for a corresponding equation based on respective data protocol formats enables the incoming data packet to be evaluated for the presence of the prescribed attributes in real time, independent of whether those attributes are implemented in different data protocol formats, for example Ipv4 or IPv6. Hence, the network switch port can easily support multiple data protocol formats with little or no modification to the existing network switch programming.

Another aspect of the present invention provides a method of evaluating an incoming data packet at a network switch port. The method includes simultaneously comparing a first byte of the incoming data packet as the first byte is received by the network switch port, with a plurality of equations configured for identifying respective attributes of the incoming data packet, each equation having at least first and second branches configured for determining whether the incoming data packet has the corresponding data attribute according to first and second data protocol formats, respectively, by comparing the first byte with at least a first min term associated with at least one of the branches. The method also includes simultaneously comparing a second byte of the incoming data packet, following the first byte, with the branches of the equations by comparing the second byte with at least a second min term associated with at least one of the branches. A comparison result is then generated based on min term results from the comparisons of the first byte and the second byte relative to the plurality of equations.

Still another aspect of the present invention provides a network switch port filter configured for evaluating an incoming data packet. The network switch port filter includes a min term memory configured for storing at least first and second min term values, each min term value stored based on a location of a corresponding selected byte of the incoming data packet for comparison, an expression portion specifying a corresponding comparison operation, and a branch identifier field that specifies branches that use the corresponding min term, the first and second min term values each configured for identifying a corresponding data protocol format for a corresponding branch. The network switch port filter also includes a min term generator configured for simultaneously comparing a received byte of the incoming data packet with the min terms that correspond to the received byte and generating respective min term comparison results. The network switch port filter also includes an equation core configured for generating a frame tag identifying an attribute of the incoming data packet, independent of a data protocol format of the incoming data frame, based on the min term comparison results relative to the branches.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is an enhancement of commonly-assigned, copending application Ser. No. 09/430, 753, filed Oct. 29, 1999, entitled "Apparatus and Method for Identifying Data Packet Types in Real Time on a Network Switch Port". In particular, the disclosed embodiment utilizes the template structures disclosed in the copending application Ser. No. 09/430,753 to define equations capable of identifying respective attributes of an incoming data packet using multiple branches, wherein each branch of the corresponding equation is configured for determining whether the incoming data packet has the corresponding data attribute according to a corresponding data protocol format, for example a prescribed version of Internet protocol. As described in detail below, each equation can have multiple branches having identical min terms for identification of generic data attributes, were the branches having the identical min terms are distinguishable based on unique min terms that identifies a corresponding data protocol format, for example IPv4 or IPv6.

Hence, a network switch port can be easily configured, using equations having multiple branches, to identify a prescribed data attribute of the incoming data packet, for example whether the incoming data packet is in the mail message, regardless of whether the data packet is carrying layer 3 information in IPv4 format or IPv6 format.

Figure 1:
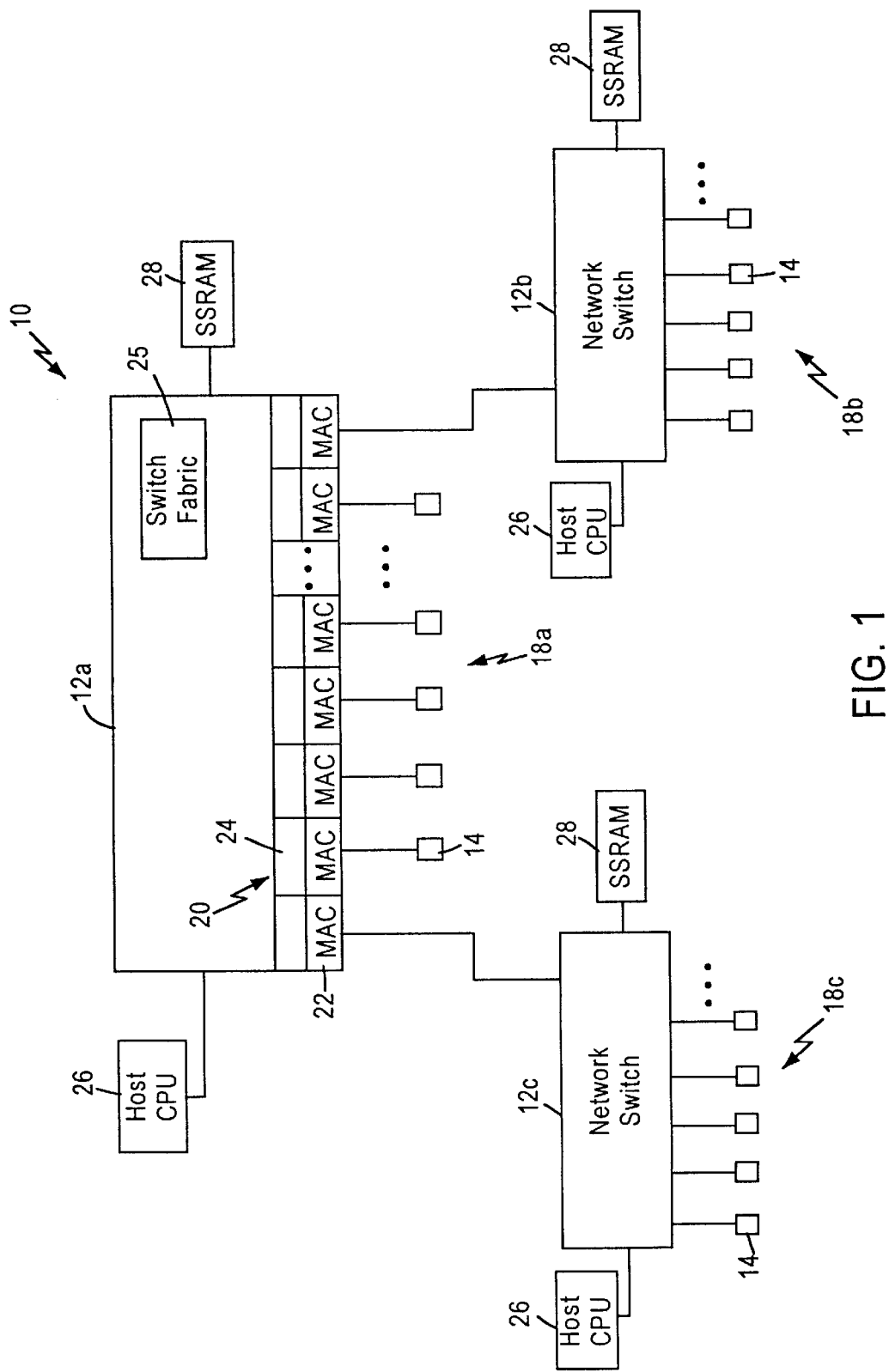
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18*a* wishes to send an e-mail message to selected network stations in subnetwork 18*b*, 18*c*, or both; if only layer 2 switching decisions were available, then the switch fabric 25 of switch 12*a* would send the e-mail message to switches 12*b* and 12*c* without specific destination address information, causing switches 12*b* and 12*c* to flood all their ports. Otherwise, the switch fabric 25 of switch 12*a* would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12*a* to remotely program another switch, for example switch 12*b*, by sending a message having an IP address corresponding to the IP address of the switch 12*b*; the switch 12*b*, in response to detecting a message addressed to the switch 12*b*, can forward the message to the corresponding host CPU 26 for programming of the switch 12*b*.

Figure 2:
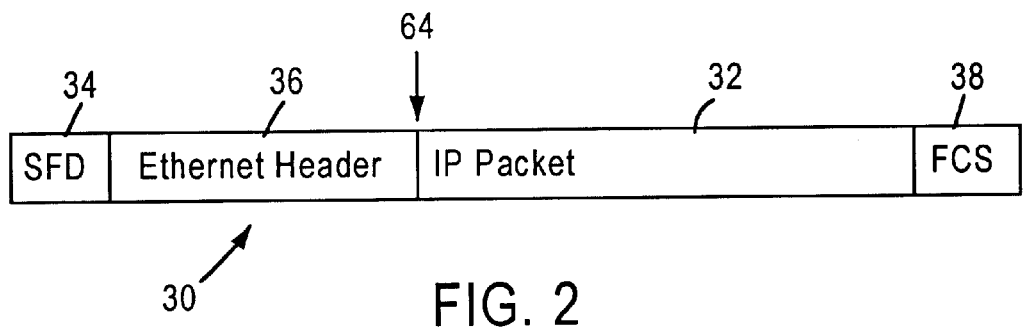
FIG. 2 is a diagram illustrating a conventional layer 2 Ethernet-type data packet carrying a layer 3 Internet protocol (IP) packet.

FIG. 2 is a diagram illustrating an Ethernet (IEEE 802.3) packet 30 carrying an IP packet 32 as payload data. Specifically, the Ethernet packet 30 includes a start frame delimiter (SFD) 34, an Ethernet header 36, the IP packet 32, and a cyclic redundancy check (CRC) or frame check sequence (FCS) field 38. Hence, a switch fabric 25 configured for layer 3 switching decisions needs to be able to quickly process the IP packet 32 within the received Ethernet frame 30 to avoid blocking of the frame within the switch.

Figure 3:
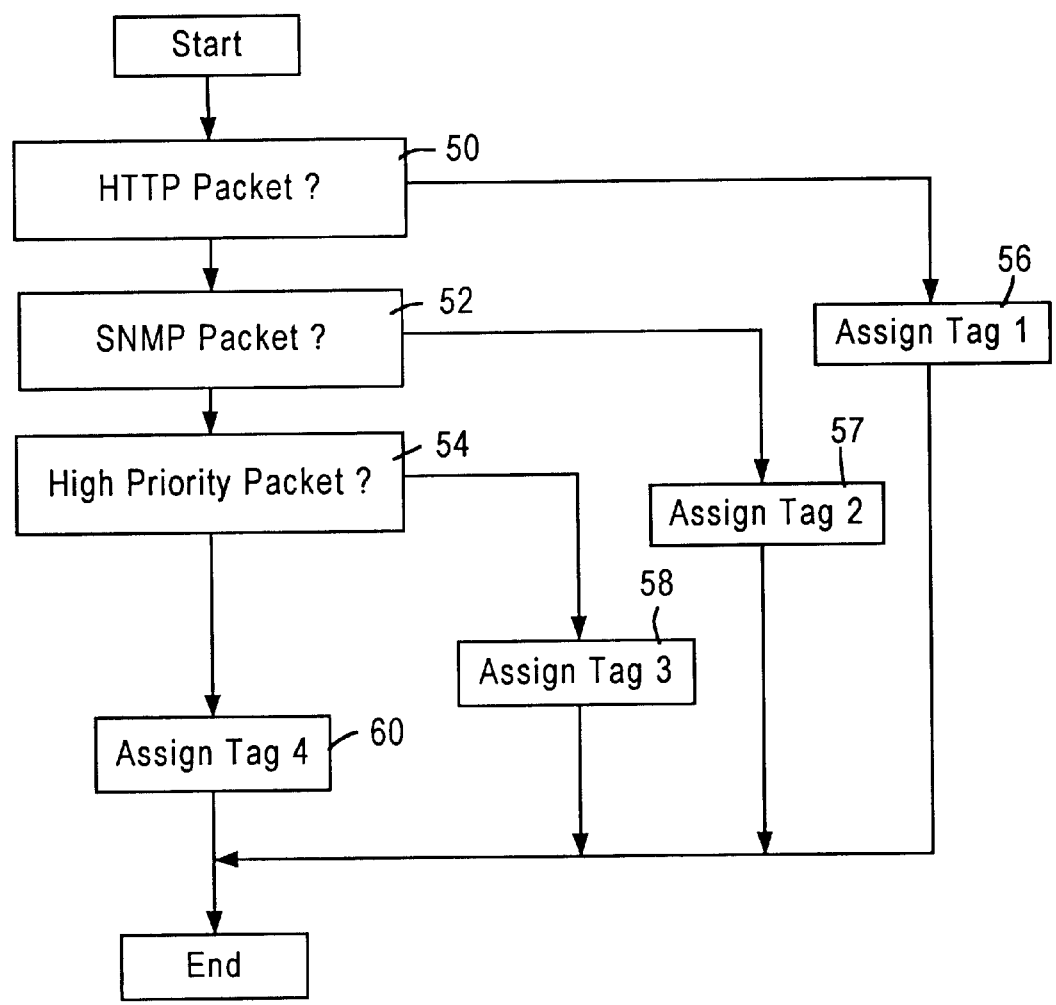
FIG. 3 is a flow diagram illustrating a conventional (prior art) method of evaluating an IP packet.

FIG. 3 is a flow diagram illustrating an example of the type of layer 3 processing that might be performed for an incoming data packet. The flow diagram of FIG. 3, conventionally implemented in software, would involve checking whether the incoming data packet was a hypertext transport protocol (HTTP) packet in step 50, an SNMP packet in step 52, or a high-priority packet in step 54. The appropriate tag would then be assigned identifying the packet in steps 56, 57, 58, or 60.

The arrangement of FIG. 3, however, cannot from a practical standpoint be implemented in hardware in a manner that would provide a non-blocking switch for 100 Mbps or gigabit networks. In particular, the sequential nature of the decision process in FIG. 3 would result in undue latency for the incoming data packet.

According to the disclosed embodiment, the packet classifier module 24 of FIG. 1 is configured for multiple simultaneous comparisons between the incoming data stream and templates (i.e., branches) that identify the data format of the incoming data stream. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 4:
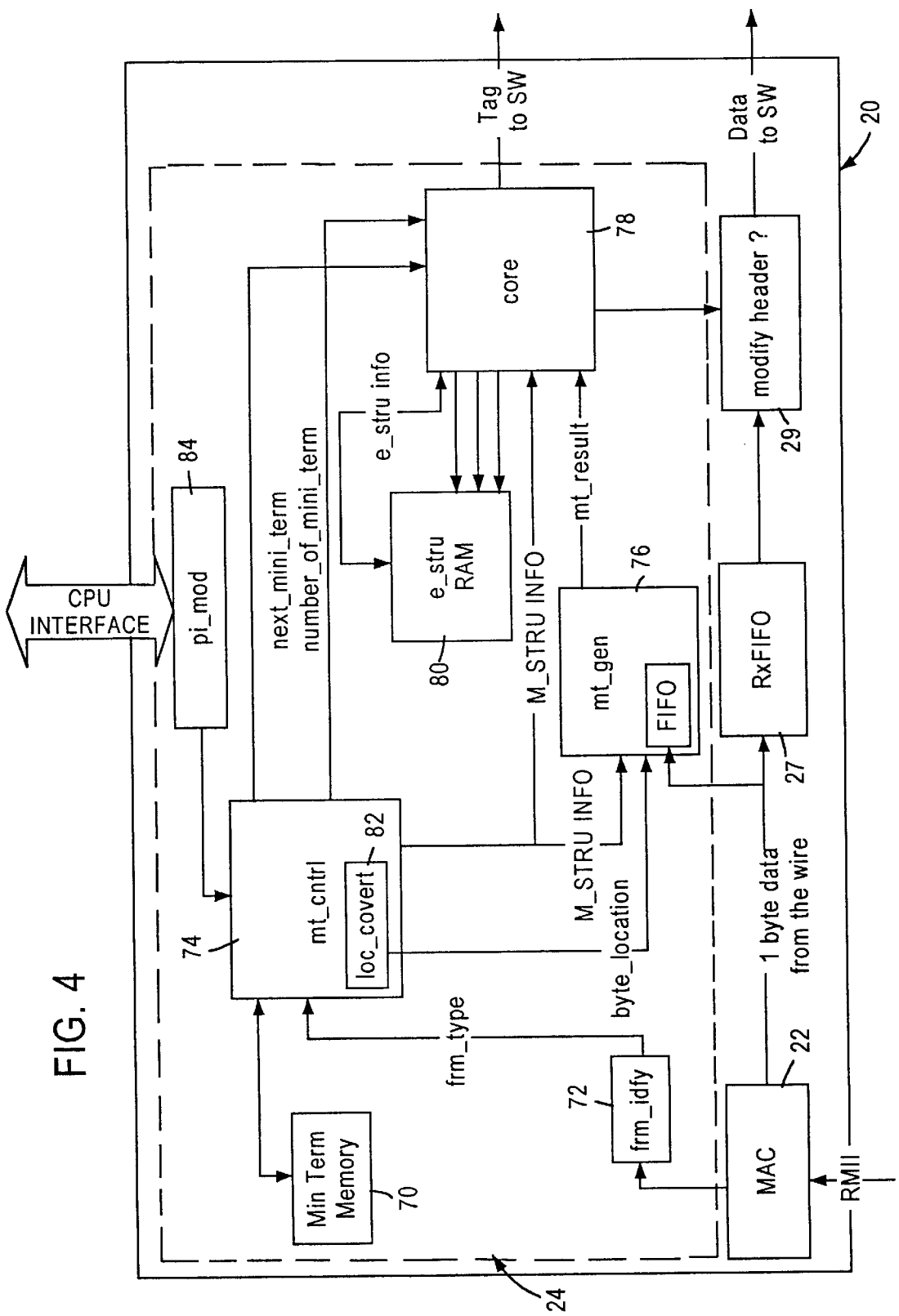
FIG. 4 is a block diagram illustrating the network switch port of FIG. 1, including the network switch port filter, according to an embodiment of the present invention.

FIG. 4 is a block diagram illustrating the packet classifier module 24 according to an embodiment of the present invention. As shown in FIG. 4, the network switch port 20 includes a MAC 22, a receive FIFO buffer 27, a header modifier 29, and the packet classifier module 24. The packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received (i.e., a detected attribute of the data packet). Specifically, the packet classifier module 24 simultaneously compares the incoming data packet with a plurality of equations configured for identifying respective data attributes. The packet classifier module 24, based on the comparison between the incoming data packet and multiple branches, described below, an equation to be executed that specifies the tag to be supplied to the switch fabric 25.

Specifically, the packet classifier module 24 generates a comparison result that identifies the incoming data packet by detecting at least one matched branch from a plurality of branches. A branch, described in detail below, includes at least one min term for determining a data attribute according to a prescribed data protocol format; for example, an equation may evaluated based on multiple branches, where the equation is executed based on a match of any one of its branches by the packet classifier module. Hence, the packet classifier module 24 identifies which of the equations includes the matched branch, and generates the tag specified by the equation.

Figure 5:
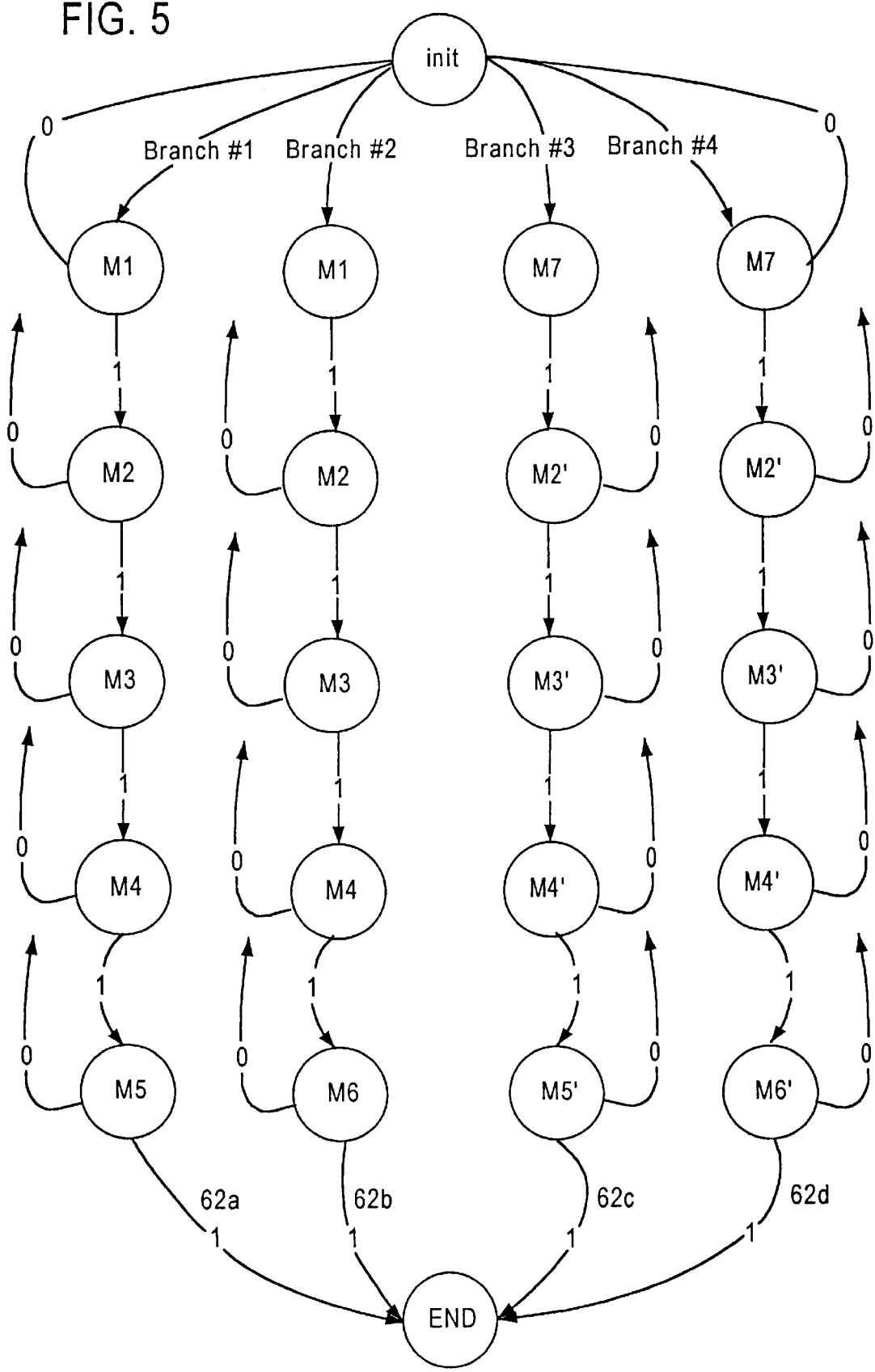
FIG. 5 is a diagram illustrating simultaneous processing of four templates of an equation by the min term generator of FIG. 4.

FIG. 5 is a diagram illustrating the simultaneous processing of four branches (i.e., templates) of an equation by the packet classifier module 24. FIG. 5 illustrates the logical evaluation by the packet classifier module 24 of the equation:

$$Eq1 = M1*M2*M3*M4*M5 +$$
$$M1*M2*M3*M4*M6 +$$
$$M7*M2'*M3'*M4'*M5' +$$
$$M7*M2'*M3'*M4'*M6'.$$

The equation Eq1 includes four branches 62*a*, 62*b*, 62*c*, and 62*d*: the branch 62*a* includes the min terms M1, M2, M3, M4, and M5; the branch 62*b* includes the min terms M1, M2, M3, M4, and M6; the branch 62*c* includes the min terms M7, M2', M3', M4', and M5'; and the branch 62*d* includes the min terms M7, M2', M3', M4', and M6'. Each branch 62 is configured for identifying a corresponding attribute of the IP frame, where certain branches 62 may be configured for identifying different frame types, and/or whether the frame is an IPv4 or an IPv6 frame. For example, branches 62*a* and 62*b* may be configured for identifying an IPv4 SNMP packet, and branches 62*c* and 62*d* may be configured for identifying an IPv6 SNMP packet. An IPv4 SNMP packet is identified if it is in IPv4 format, the time to live field in IP is bigger than one, the protocol field in IP header is TCP, header checksum is correct, source TCP port is 25 or destination TCP port is 25. Similarly, an IPv6 SNMP packet would be identified if it is in IPv6 format, the time to live field in IP is bigger than one, the protocol field in IP header is TCP, header checksum is correct, source TCP port is 25 or destination TCP port is 25. Note that the IP version is specified in the first byte of the IP header.

Hence, the following min terms may be established to represent all the above-described criteria:

M1=packet is in IPv4 format
M2=M2'=time to live field in IP is bigger than one
M3=M3'=protocol field in IP header is TCP
M4=M4'=header checksum is correct
M5=M5'=source TCP port is 25
M6=M6'=destination TCP port is 25
M7=packet is in IPv6 format The min terms M3, M4, M5, and M6 differ from the min terms M3' M4', M5', and M6' respectively only based on the data byte specified for comparison, due to the difference in header formats between IPv4 headers and IPv6 headers. Thus, equation one (Eq1) specifies that a specific result (e.g., the tag having a specified value) should be output to the switch fabric 25 if either template 62*a*, 62*b*, 62*c*, or 62*d* are true. Hence, equation one (Eq1) can identify an SNMP packet, regardless of whether the packet is in IPv4 format or IPv6 format.

As apparent from the foregoing, different branches may be programmed to identify IPv4 or IPv6 HTTP packets. Specifically, an IPv4 HTTP packet is identified if it is in IPv4 format, the time to live field in IP is bigger than one, the protocol field in IP header is TCP, header checksum is correct, source TCP port is 80 or destination TCP port is 80. Similarly, an IPv6 HTTP packet is identified if it is in IPv6 format, the time to live field in IP is bigger than one, the protocol field in IP header is TCP, header checksum is correct, source TCP port is 80 or destination TCP port is 80.

Figure 6:
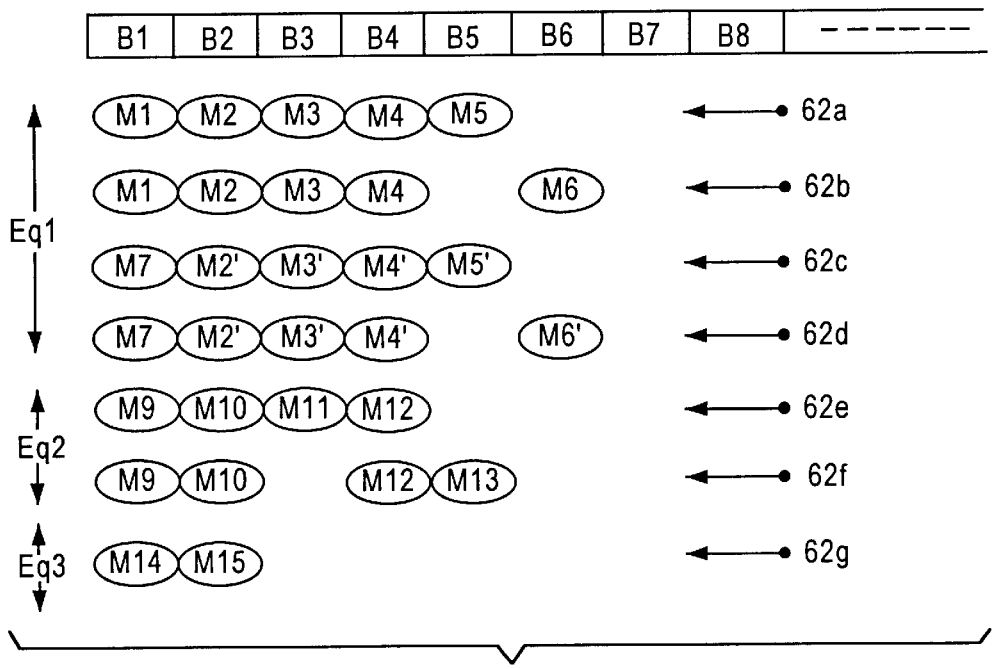
FIG. 6 is a diagram illustrating in further detail the simultaneous processing of min terms by the min term generator of FIG. 4.

The min terms M1 . . . M9 are arranged within the associated templates 62 in a prescribed order that corresponds to the relative position of a data byte in the incoming data stream. As illustrated in FIG. 6, the min terms M1 and M9 are configured for comparison with the first byte (B1) of the IP packet 32. The remaining min terms assume the same IP location for simplicity of illustration: the min terms M2 and M2' are configured for comparison with a subsequent byte (B2) of the IP packet 32 that follows B1, the min terms M3 and M3' are configured for comparison with a subsequent byte (B3) that follows B2, etc. Hence, the use of templates 62 having min terms in an order based on the relative position of a data byte in the incoming data stream enables multiple simultaneous comparisons between the incoming data stream and min terms. Hence, an incoming data packet can be compared to multiple templates (i.e., branches) to determine not only the data format of the incoming data packet, but also what action needs to be performed by the switch fabric 25.

Figure 7:
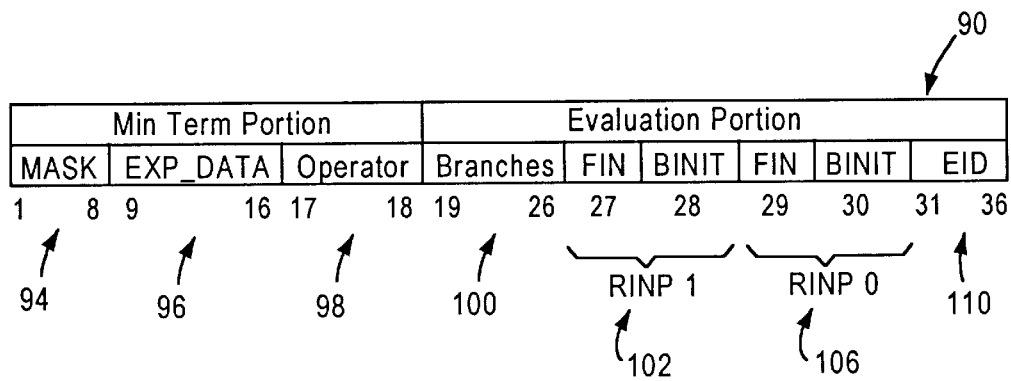
FIG. 7 is a diagram illustrating a table entry of a min term in the min term memory of FIG. 4 according to an embodiment of the present invention.

FIG. 4 is a block diagram illustrating in detail the packet classifier 24 of FIG. 1. As shown in FIG. 4, the packet classifier 24, also referred to as a network switch port filter, includes a min term memory 70 for storing the min term values (e.g., M1, M2, etc.) as illustrated in FIG. 7, described below. The packet classifier 24 also includes a frame identifier 72 configured for identifying the type of layer 2 frame being received; in particular, identifying the type of layer 2 frame being received (e.g., Ethernet, IEEE 802 to 3, etc.) enables identification of the start position 64 of the IP packet 32 within the layer 2 packet 30. The packet classifier 24 also includes a min term controller 74, a min term generator 76, an equation core 78, and an evaluation results memory 80. A processor interface module (pi_mod) 82 is used for transferring the generated min terms from the host CPU 26 into the min term memory 70.

The min term controller 74 is configured for fetching the min terms from the min term memory 70 corresponding to a selected byte of the IP frame 32. The min term controller 74 also includes a location converter configured for specifying the actual byte location (byte_location) of the start point 64 in response to receiving a frame type (frm_type) signal from the frame identifier 72 that specifies the type of layer 2 frame. Hence, the min term controller 74, in response to detecting the beginning of the IP packet, fetches all the min terms that are to be compared with the first byte (B1) of the IP packet 32, for example min terms M1, M7, M9, and M14 for equations Eq1, Eq2, and Eq3 in FIG. 6. The min term controller 74 then forwards the min term values (M_STRU INFO) to the min term generator 76 and the equation core 78.

The min term generator 76 performs the actual min term comparisons between the min terms fetched by the min term controller and the selected byte of the incoming data stream. For example, the min term generator 76 simultaneously compares in FIG. 6 the incoming data byte B1 with the min terms M1, M7, M9, and M14, and provides the min term comparison results (mt_result) to the equation core 78. During the next comparison cycle, the min term generator 76 simultaneously compares the incoming data byte B2 with the min terms M2, M2' (assuming the same byte location), M10, and M15. According to the disclosed embodiment, the min term generator is configured for simultaneously comparing the incoming data stream to up to eight min terms.

The equation core 78 is configured for generating a frame tag based on the min term comparison results received from the min term generator 76, relative to the relevant templates 62. For example, the equation core 78 evaluates equation 1, illustrated in FIG. 5, by evaluating the min term results sequentially as the results are supplied from the min term generator. For example, if the comparisons for each of the min terms M1, M2, M3, M4, M5, result in a true condition, described below with respect to FIG. 7, then the end condition is matched in equation 1, causing the equation core 78 to generate a tag corresponding to the condition specified for equation 1. The frame tag identifies the nature of the incoming data packet, as well as the action that needs to be performed by the switch fabric 25.

FIG. 7 is a diagram illustrating the data format of the min term structure in the min term memory 70. According to the disclosed embodiment, the min terms are stored in the min term memory 70 in an order corresponding to the relative position of the data byte to be compared. Hence, all min terms that are to be compared to the first data byte are stored together in a first part of the min term memory, followed by min terms to be compared with the second data byte, etc.

Alternatively, the min terms may be stored in an order based on relevant information within the IP header, as well as the relative position of the data byte to be compared. Hence, the min terms may be stored in an order for comparing the sequence of data bytes providing the source IP address, destination IP address, and source and source and destination ports; in this case, non-relevant data bytes at the beginning of the IP frame would not have associated min terms stored at the beginning of the min term memory 70, further improving the efficiency of the min term memory 70.

Each table entry 90 includes a min term portion and an evaluation portion. The min term portion includes a mask field (MASK) 94, an expected data field (EXP_DATA) 96, and an operator field (OPERATOR) 98. Based on the position of the table entry 90 in the min term memory 70, the min term controller 74 is able to determine which byte of the IP packet 32 that needs to be compared with the corresponding min term, relative to the beginning 64 of the IP packet. The mask field 94 is a mask that is used by the min term generator 76 in performing comparisons; if the mask has a bit set to 1, the value is compared, and if the mask value has zeros in the field, the comparison is a don't care. The expected data field 96 specifies the expected data to be compared with the relevant data byte of the IP packet 32. The operator field 98 specifies the type of comparison to be performed by the min term generator, for example: less than, less than or equal to, equal to, greater than, greater than or equal to, and not equal to.

The evaluation portion includes a branches portion 100, a response portion (RINP1) 102 for the case where the comparison of the min term portion is true, a second response portion (RINP0) 106 for the case where the comparison of the min term portion is false, and an equation identifier 110. The branches portion 100 specifies the order of the OR term in the equation; for example, the min term M1 as shown in FIGS. 5 and 6 would have its branches portion set to 0000 1111, indicating that the first four branches of the equation specified in the equation identifier field 110 are to include the corresponding min term. The use of eight bits for the branches portion assumes that there are a maximum of eight branches in any given equation.

The response portion 102 specifies the operation to be performed if the min term portion is evaluated as true relative to the compared data byte. In particular, the finish bit (FIN) is set to one if the results of the equation is determined if the min term result is true; the back to initial (BINIT) is set to one if the evaluation process should return to the initial state (init) if the min term result is true. For example, in the case of min term M1, the FIN bit and the BINIT bit of RINP1 are set to zero, since additional comparisons are needed if the min term result is true. In the case of min terms M5, M6, M7, and M8, the FIN bit of RINP1 is set to one, since a comparison result of "true" results in the end of the evaluation, as shown in FIG. 5.

The response portion 106 specifies the operation to be performed if the min term portion is evaluated as false relative to the compared data byte. In particular, the finish bit (FIN) is set to one if the results of the equation is determined if the min term result is false; the back to initial (BINIT) is set to one if the evaluation process should return to the initial state (init) if the min term result is false. For example, in the case of min term M1, the FIN bit is set to zero and the BINIT bit of RINP1 is set to one, such that the equation would return to the INIT state if the min term result M1 was false, as shown in FIG. 5.

The equation identifier field 110 identifies the equation (or template if there is only one template in an equation) that the min term corresponds to.

Hence, the equation core 78 determines whether any specified equation has a template 62 that matches the incoming data stream. Based on the multiple simultaneous comparisons of the incoming data stream with the multiple templates 62, the equation core 78 can identify a matching equation, and generate the appropriate tag corresponding to the matched equation for help it to the switching fabric 25. If desired, the core 78 by also output a command to the header modifier 29 to modify the layer 2 header, the layer 3 header, or both, before transferring the data to the switch.

According to the disclosed embodiment, a network switch port includes a filter capable of performing multiple simultaneous comparisons between the incoming data stream of the data packet and multiple templates configured for identifying a corresponding protocol. Since the packet classifier module 24 can process any of the bytes of the IP frame 32, the packet classifier module 24 can interpret all the header information in the IP packet 32 from layer 3 up to layers 7 protocols. Moreover, the multiple simultaneous comparisons enables the network switch 12 to perform layer 3 switching for 100 Mbps and gigabit networks without blocking in the network switch. Finally, the multiple simultaneous comparisons in the order in which the data is received enables real time comparisons to be performed, as opposed to alternative schemes such as programmable logic arrays (PLAs), which would require the entire header to be received before processing can begin.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of evaluating an incoming data packet at a network switch port, the method comprising:

storing a plurality of equations configured for identifying respective data attributes of the incoming data packet, each equation having at least first and second branches for determining whether the incoming data packet has the corresponding data attribute according to first and second data protocol formats, respectively, each branch including at least one min term configured for comparing a corresponding prescribed value to a corresponding selected byte of the incoming data packet;

independently evaluating the incoming data packet with the branches by simultaneously comparing, to the selected byte, the min terms that correspond to the selected byte as the selected byte is received by the network switch port; and generating a comparison result that identifies the data attribute of incoming data packet independent of whether the data packet has one of the first and second data protocol formats, based on the comparisons of the min terms to the data bytes received by the network switch port.

2. The method of claim 1, wherein the simultaneously comparing step includes:

loading the min terms corresponding to a first of the data bytes into a min term generator;

comparing in parallel the min terms loaded in the min term generator with the first of the data bytes; and outputting comparison results for the min terms loaded in the min term generator to an equation core.

3. The method of claim 2, wherein the simultaneously comparing step further includes loading the min terms corresponding to a second of the data bytes, contiguously following the first of the data bytes, into the min term generator.

4. The method of claim 1 further comprising outputting a frame tag, based on the comparison result, to a switch fabric configured for selectively switching the incoming data packet based on the corresponding frame tag.

5. The method of claim 1, wherein the storing step includes storing each min term in a memory as a table entry, each table entry having a location in the memory based on a location of the corresponding selected byte in the incoming data packet, the table entry including a min term expression portion specifying the corresponding prescribed value and a comparison operand, and a branch identifier field that specifies the branches that use the corresponding min term.

6. The method of claim 5, wherein the generating step includes:

temporarily storing results of the comparisons of the min terms to the selected bytes of the incoming data packet;

detecting at least one matched branch based on the results of the comparisons of the min terms; and generating the comparison result based on the detected at least one matched branch.

7. The method of claim 5, wherein the first of the data bytes corresponds to a first of the data bytes of a packet having a prescribed data protocol, the simultaneously comparing step including evaluating the selected data byte relative to a beginning of the packet having the prescribed protocol.

8. The method of claim 7, wherein the prescribed protocol is Internet protocol (IP) and the first and second data protocol formats are IPv4 and IPv6, respectively.

9. A method of evaluating an incoming data packet at a network switch port, the method comprising:

simultaneously comparing a first byte of the incoming data packet as the first byte is received by the network switch port, with a plurality of equations configured for identifying respective attributes of the incoming data packet, each equation having at least first and second branches configured for determining whether the incoming data packet has the corresponding data attribute according to first and second data protocol formats, respectively, by comparing the first byte with at least a first min term associated with at least one of the branches;

simultaneously comparing a second byte of the incoming data packet, following the first byte, with the branches of the equations by comparing the second byte with at least a second min term associated with at least one of the branches; and generating a comparison result based on min term results from the comparisons of the first byte and the second byte relative to the plurality of equations.

10. The method of claim 9, wherein the first min term is associated with the first branch and a third min term, configured for comparison with the first byte, is associated with the second branch, the step of simultaneously comparing the first byte including simultaneously comparing the first byte with the first and third min terms.

11. The method of claim 10, wherein each branch has a plurality of min terms for comparison with respective bytes of the incoming data packet, the method further comprising successively comparing the min terms of the branches based on the relative positions of the respective bytes of the incoming data packet.

12. The method of claim 10, wherein the first min term is configured for identifying an IPv4 data frame and the third min term is configured for identifying an IPv6 data frame.

13. A network switch port filter configured for evaluating an incoming data packet at a network switch port, comprising:

a min term memory configured for storing at least first and second min term values, each min term value stored based on a location of a corresponding selected byte of the incoming data packet for comparison, an expression portion specifying a corresponding comparison operation, and a branch identifier field that specifies branches that use the corresponding min term, the first and second min term values each configured for identifying a corresponding data protocol format for a corresponding branch;

a min term generator configured for simultaneously comparing a received byte of the incoming data packet with the min terms that correspond to the received byte and generating respective min term comparison results; and an equation core configured for generating a frame tag identifying an attribute of the incoming data packet, independent of a data protocol format of the incoming data frame, based on the min term comparison results relative to the branches.

14. The filter of claim 13, further comprising a frame identifier configured for identifying a type of layer 2 packet, the selected byte of the incoming data packet determined based on the identified type of layer 2 packet.

15. The filter of claim 14, wherein the location of each stored min term value is relative to a beginning of an IP frame within the layer 2 packet, the first and second min terms configured for identifying an IPv4 data protocol format and an IPv6 data protocol format, respectively.

16. The filter of claim 15, further comprising a min term controller configured for fetching the min terms from the min term memory corresponding to a selected byte of the IP frame within the incoming data packet.

17. The filter of claim 13, wherein the equation core is configured to output the frame tag to a switch fabric of the network switch, the switch fabric being configured for selectively switching the incoming data packet based on the corresponding frame tag.

* * * * *